(12) United States Patent
Walley et al.

(10) Patent No.: US 12,237,695 B2
(45) Date of Patent: *Feb. 25, 2025

(54) RECTIFIER BUCK WITH EXTERNAL FET

(71) Applicant: Avago Technologies International Sales Pte. Limited, Singapore (SG)

(72) Inventors: John Walley, Ladera Ranch, CA (US); Marc Keppler, Windsor, CO (US); Jim Le, Timnath, CO (US); Chongming M. Qiao, Irvine, CA (US); Shiju Wang, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/515,083

(22) Filed: Nov. 20, 2023

(65) Prior Publication Data

US 2024/0088719 A1    Mar. 14, 2024

Related U.S. Application Data

(63) Continuation of application No. 17/872,316, filed on Jul. 25, 2022, now Pat. No. 11,862,986.

(51) Int. Cl.
| | |
|---|---|
| *H02J 50/12* | (2016.01) |
| *H02J 7/02* | (2016.01) |
| *H02J 50/80* | (2016.01) |
| *H02M 1/08* | (2006.01) |
| *H02M 3/158* | (2006.01) |

(52) U.S. Cl.
CPC ............. *H02J 50/12* (2016.02); *H02J 7/02* (2013.01); *H02J 50/80* (2016.02); *H02M 1/08* (2013.01); *H02M 3/158* (2013.01)

(58) Field of Classification Search
CPC .. H02J 7/02; H02J 50/12; H02J 50/80; H02M 1/08; H02M 3/158
USPC .......................................................... 307/104
See application file for complete search history.

(56) References Cited

U.S. PATENT DOCUMENTS

| | | |
|---|---|---|
| 8,144,815 B2 | 3/2012 | Norris |
| 9,685,882 B2 | 6/2017 | Kim et al. |
| 9,859,797 B1 | 1/2018 | Leabman |
| 9,935,681 B2 | 4/2018 | Lingam et al. |

(Continued)

OTHER PUBLICATIONS

Notice of Allowance mailed Aug. 23, 2023, 22 pages.

*Primary Examiner* — William Hernandez
(74) *Attorney, Agent, or Firm* — Quarles & Brady LLP (57) ABSTRACT

A system is disclosed. The system includes a first circuit that includes a first receiver configured to receive a wireless power input, a first conductor, and operably coupled to the first receiver, and a switch network operably coupled to the first conductor configured to rectify the wireless power input and generate a rectified voltage. The first circuit further includes a first field effect transistor operably coupled to the first conductor and configured to receive a portion of the wireless power input from the first conductor and output an output voltage back to the first conductor based upon a gate input. In one or more embodiments, the first circuit further includes a first controller configured to determine if the rectified voltage is greater than a voltage threshold and transmit a transmission of the gate input to the first field effect transistor if the rectified voltage is above the voltage threshold

18 Claims, 10 Drawing Sheets

(56) References Cited

U.S. PATENT DOCUMENTS

| | | | |
|---|---|---|---|
| 10,218,225 B2 | 2/2019 | Desrosiers | |
| 10,277,072 B2 | 4/2019 | Yet et al. | |
| 11,095,170 B1 | 4/2021 | Wang | |
| 11,171,493 B2 | 11/2021 | Kun et al. | |
| 11,264,833 B2 | 3/2022 | Warren et al. | |
| 2013/0093256 A1* | 4/2013 | Choi | H02J 50/05 307/104 |
| 2014/0247141 A1 | 9/2014 | Proud | |
| 2017/0019226 A1 | 1/2017 | Yonge, III et al. | |
| 2017/0098966 A1* | 4/2017 | Walley | H02M 7/219 |
| 2017/0104368 A1* | 4/2017 | Radke | H02J 50/80 |
| 2017/0141585 A1* | 5/2017 | Walley | H02M 7/1626 |
| 2017/0288463 A1* | 10/2017 | Nakahara | H02J 50/70 |
| 2018/0102675 A1* | 4/2018 | Wheeland | H02M 7/06 |
| 2018/0323828 A1* | 11/2018 | Hwang | H04B 5/72 |
| 2018/0351392 A1 | 12/2018 | Malkin et al. | |
| 2019/0190765 A1 | 1/2019 | Murali et al. | |
| 2019/0074726 A1* | 3/2019 | Hosotani | H02J 50/40 |
| 2019/0109739 A1 | 4/2019 | Oettinger | |
| 2020/0220388 A1* | 7/2020 | Liu | H02M 7/219 |
| 2021/0367457 A1 | 11/2021 | Sherman | |
| 2021/0376643 A1 | 12/2021 | Paparrizos et al. | |
| 2023/0047559 A1* | 2/2023 | Kim | H02J 50/60 |
| 2024/0097493 A1* | 3/2024 | Huang | H02M 7/219 |

\* cited by examiner

RECTIFIER BUCK WITH EXTERNAL FET

CROSS REFERENCE TO RELATED APPLICATIONS

This application is a continuation of U.S. patent application Ser. No. 17/872,316, filed Jul. 25, 2022, by John Walley et al. and titled, "RECTIFIER BUCK WITH EXTERNAL FET", the entire teachings of which is hereby incorporated by reference in its entirety for all purposes.

BACKGROUND

Many communication devices (e.g., smartphones, tablets) use wireless power transfer (WPT) as a method to charge the battery within the communication device without the need for a compatible plug-in charger. In this manner, WPT transmitters from different manufacturers are able to charge the same communication device having WPT reception capability. However, WPT transmitters may transmit, either by design or by malfunction, a voltage that is higher than can be effectively handled by the communication device. These overvoltages can damage communication device componentry if not handled competently. Current solutions for handling overvoltages often result in intermittent shutdown of the charging process, which is an inefficient method for controlling overvoltages and hinders communication between the WPT transmitter and the communication device. Accordingly, it is desirable to provide a WPT overvoltage protection system and method that does not cause a shutdown of the charging process.

SUMMARY

A system for rectifying power is disclosed. In one or more embodiments, the system includes a first circuit for a first apparatus. In one or more embodiments, the first circuit includes a first receiver configured to receive a wireless power input from a second apparatus, a first conductor operably coupled to the first receiver, and a switch network operably coupled to the first conductor, wherein the switch network is configured to rectify the wireless power input and generate a rectified voltage. In one or more embodiments, the first circuit further includes a first field effect transistor operably coupled to the first conductor and configured to receive a portion of the wireless power input from the first conductor and output an output voltage back to the first conductor based upon a gate input. In one or more embodiments, the first circuit further includes a first controller configured to determine if the rectified voltage is greater than a voltage threshold and transmit a transmission of the gate input to the first field effect transistor if the rectified voltage is above the voltage threshold.

Another system is disclosed. In one or more embodiments, the system includes a first circuit for a first apparatus. In one or more embodiments, the first circuit includes a first receiver configured to receive a wireless power input from a second apparatus, a first conductor operably coupled to the first receiver, and a switch network operably coupled to the first conductor, wherein the switch network is configured to rectify the wireless power input and generate a rectified voltage. In one or more embodiments, the first circuit further includes a first field effect transistor operably coupled to the first conductor and configured to receive a wireless power input and output an output voltage back to the first conductor based upon a gate input. In one or more embodiments, the first field transistor comprises a source conductor operably coupled to one switch of the plurality of switches and a drain conductor operably coupled to another switch of the plurality of switches. In one or more embodiments, the first circuit further includes a first controller configured to determine if the rectified voltage is greater than a voltage threshold and transmit a transmission of the gate input to the first field effect transistor if the rectified voltage is above the voltage threshold.

Another system, comprising a first apparatus, is disclosed. In one or more embodiments, the first apparatus includes a first circuit, which includes a first receiver configured to receive a wireless power input from a second apparatus, a first conductor operably coupled to the first receiver, and a switch network comprising a plurality of switches coupled to the first conductor, wherein the switch network is configured to rectify the wireless power input and generate a rectified voltage. In one or more embodiments, the first circuit further includes a first field effect transistor operably coupled to the first conductor and configured to receive a portion of the wireless power input from the first conductor and output an output voltage back to the first conductor based upon a gate input. In one or more embodiments, the first circuit further includes a first controller configured to determine if the rectified voltage is greater than a voltage threshold and transmit a transmission of the gate input to the first field effect transistor if the rectified voltage is above the voltage threshold.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

It is to be understood that depicted architectures are merely exemplary and that many other architectures can be implemented which achieve the same functionality. In a conceptual sense, any arrangement of components to achieve the same functionality is effectively "associated" such that the desired functionality, common goal, objective, and/or result is achieved. Hence, any two components herein combined to achieve a particular functionality can be seen as "associated with" each other such that the desired functionality, common goal, objective, and/or result is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality (e.g., "operatively coupled" or "electrically coupled") Additionally, unless otherwise indicated, a description indicating that one component is "connected to" another component or "between" two components indicates that such components are functionally connected and does not necessarily indicate that such components are physically in contact. Rather, such components may be in physical contact or may alternatively include intervening elements. Similarly, descriptions that a particular component is "fabricated over" another component (alternatively "located on," "disposed on," or the like) indicates a relative position of such components but does not necessarily indicate that such components are physically in contact. Such components may be in physical contact or may alternatively include intervening elements.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A wireless power transfer (WPT) receiving circuit is disclosed. The WPT receiving circuit includes wireless power receiving circuitry (e.g., coils), rectifying circuitry, and field effect transistor (FET)-containing circuitry that can effectively buck the voltage of an incoming power signal. The FET-containing circuitry allows the WPT receiving circuit to reduce incoming voltage under overvoltage conditions without shutting down the charging process, and without interrupting communication between the charging device and the device to be charged. In particular, the bucking process is accomplished by dynamically changing the impedance of an input via the FET.

Figure 1:
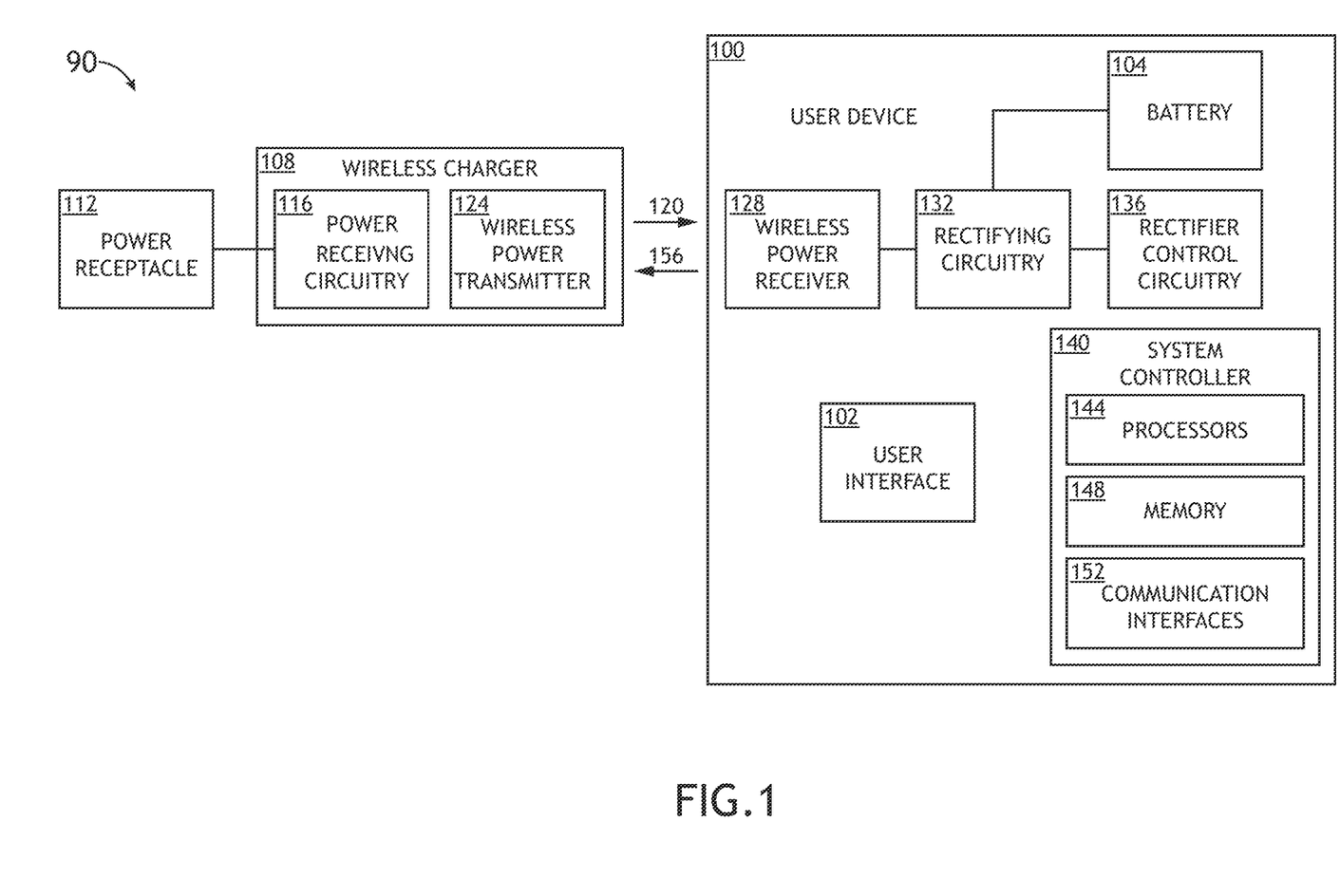
FIG. 1 is a block diagram of an environment for a user device, in accordance with one or more embodiments of the disclosure.

FIG. 1 is a block diagram of an environment 90 for a user device 100 (e.g., first apparatus), in accordance with one or more embodiments of the disclosure. The user device 100 may be configured as any type of electrically powered device. For example, the user device 100 may be configured as a mobile communication device including but not limited to a smart phone, cell phone, or tablet. In another example, the user device 100 may be configured as a media device (e.g., media playing and/or recording device). For instance, the user device 100 may include an audio device such as an audio recorder, an audio converter, an audio player, or a speaker (e.g., a Bluetooth-enabled speaker). In another instance, the user device 100 may include a video device such as a video display, a video recorder, a camera, or other video device. In another example, the user device 100 may be configured as, a driver assistance module in a vehicle, an emergency transponder, a pager, a watch, a satellite television receiver, a stereo receiver, a computer system, music player, laptop or tablet computer, home appliance, or virtually any other device. In another example, the user device 100 may be configured as a computer (e.g., a laptop computer). In another example, the user device 100 may be configured as a computing/entertainment device for a vehicle.

The user device 100 may communicate with a network controller, such as an enhanced Node B (eNB) or other base station. For example, the network controller may establish communication channels such as a control channel and a data channel, and exchange data via these channels. The user device 100 may be exposed to many other sources of wireless signals as well, (e.g., from a wireless charging pad), and wireless signals may be harvested in conjunction with the WPT and techniques described below. The user device 100 may also support one or more Subscriber Identity Modules (SIMs).

The user device 100 may include a user interface 102 and a rechargeable battery 104 that powers electronic componentry within the user device 100. The battery 104 is configured to be charged via a wireless charger 108 (e.g., a second apparatus). For example, the wireless charger 108 may be plugged into a power receptacle 112, wherein electrical power is received by power receiving circuitry 116 within the wireless charger 108, and outputted as a wireless power signal 120 via a wireless power transmitter 124. The wireless power transmitter 124 includes at least one wire coil, and transmits the wireless power signal 120 by magnetic fields using inductive coupling to a receiving coil on a wireless power receiver 128 (e.g., a first receiver) of the user device 100. Once received, the power received from the wireless power signal 120 may be referred to herein as a wireless power input. The wireless power input received by the wireless power receiver 128 is then rectified to an electrical current (e.g., a DC current) by rectifying circuitry 132 as required by the user device 100 and/or battery 104, with a portion of the power used to charge the battery 104.

In general, rectification is the conversion of an AC current, which periodically reverses direction, to a DC current, which flows in only one direction. In a general example, a rectifier may receive an input of an AC current at 120 volts from an electrical outlet, and rectify the AC current to produce an output DC current at 5 volts. In another general example, a rectifying circuit may receive an AC input current at 5 volts to produce an output DC current at 5 volts. As described herein the rectification of the input AC current may be either a rectification of a directly received AC input (e.g., from an AC source), or may be a rectification of an indirectly receive AC input that has been modified (e.g., a signal based on the AC input). For example, componentry within the user device 100 may modify the AC input from the power receiving circuitry 116, with then modified AC input, or signal, then rectified by the rectifying circuitry 132.

Power reception and modulation by the wireless power receiver 128 and the rectifying circuitry 132 are controlled by rectifier control circuitry 136 (e.g., a first controller). The rectifier control circuitry 136 performs the processive functions required for wireless power reception and battery charging. The user device 100 may utilize power directly from the wireless charger 108 or the battery 104 for operation.

The user device 100 further includes a system controller 140 that includes one or more processors 144, memory 148, and a communication interface 152. The one or more processors 144 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), one or more digital signal processors (DSPs), or a state device). In this sense, the one or more processors 144 may include any device configured to execute algorithms and/or instructions (e.g., program instructions stored in memory 148).

The memory 148 may include any storage medium known in the art suitable for storing the one or more sets of program instructions executable by the associated one or more processors 144. For example, the memory 148 may include a non-transitory memory medium. For instance, the memory 148 may include, but is not limited to, a read-only memory (ROM), a random-access memory (RAM), a magnetic or optical memory device (e.g., disk), a magnetic tape, a solid-state drive, and the like. The memory 148 may be configured to provide information to the system controller 140, or other components of the user device 100. In addition, the memory 148 may be configured to store user input. The memory 148 may be housed in a common controller housing with the one or more processors 144. The memory 148 may, alternatively or in addition, be located remotely with respect to the spatial location of the processors 144, or the system controller 140. For example, the one or more processors 144 and/or the system controller 140 may access a remote memory 148 accessible through a network (e.g., wireless, and the like) via one or more communication interfaces 152.

The one or more communication interfaces 152 may be operatively configured to communicate with components of the system controller 140 or any other componentry within the user device 100. For example, the one or more communication interfaces 152 may be configured to retrieve data from the one or more processors 144 or other devices, transmit data for storage in the memory 148, retrieve data from storage in the memory 148, and so forth. The one or more communication interfaces 152 may also be communicatively coupled with the one or more processors 144 to facilitate data transfer between components of the system controller 140, and the user device 100, including the rectifying circuitry 13 and/or rectifier control circuitry 136. It should be noted that while the one or more communication interfaces 152 are described as a component of the system controller 140, one or more components of the one or more communication interfaces 152 may be implemented as external components communicatively coupled to the system controller 140 via a wired and/or wireless connection. It should also be noted that the rectifier control circuitry 136 may also include one or more processors 114, memory, 148, and communication interfaces 152 to perform the functions described herein.

In embodiments, the user device is configured to communicate unidirectionally and/or bidirectionally with the wireless charger 108 via a wireless communication signal 156 (e.g., controlled by the system controller 140 or the rectifier control circuitry 136). The wireless communication signal 156 may be communicated (e.g., transmitted) via induction of the coils of the wireless charger 108 and/or the user device 100, or through other wireless signaling methods including but not limited to Bluetooth, WIFI, and ZigBee. Communication from the user device 100 to the wireless charger 108 creates a feedback loop wherein the user device 100 can transmit to the wireless charger 108 an instruction to change the current state of the wireless power transmitter 124 (e.g., to reduce the wireless power signal 120 due to an overvoltage). For example, the wireless power receiver 128 may be configured to transmit a signal (e.g., an amplitude shift keying (ASK) signal, a frequency shift keying (FSK) signal, or other modulation-based signal) to the wireless power transmitter 124, and the wireless power transmitter may be configured to receive and process the signal. The wireless power receiver 128 may also configured to receive and process a communication signal (e.g., ASK, FSK, or another modulated signal).

Figure 2A:
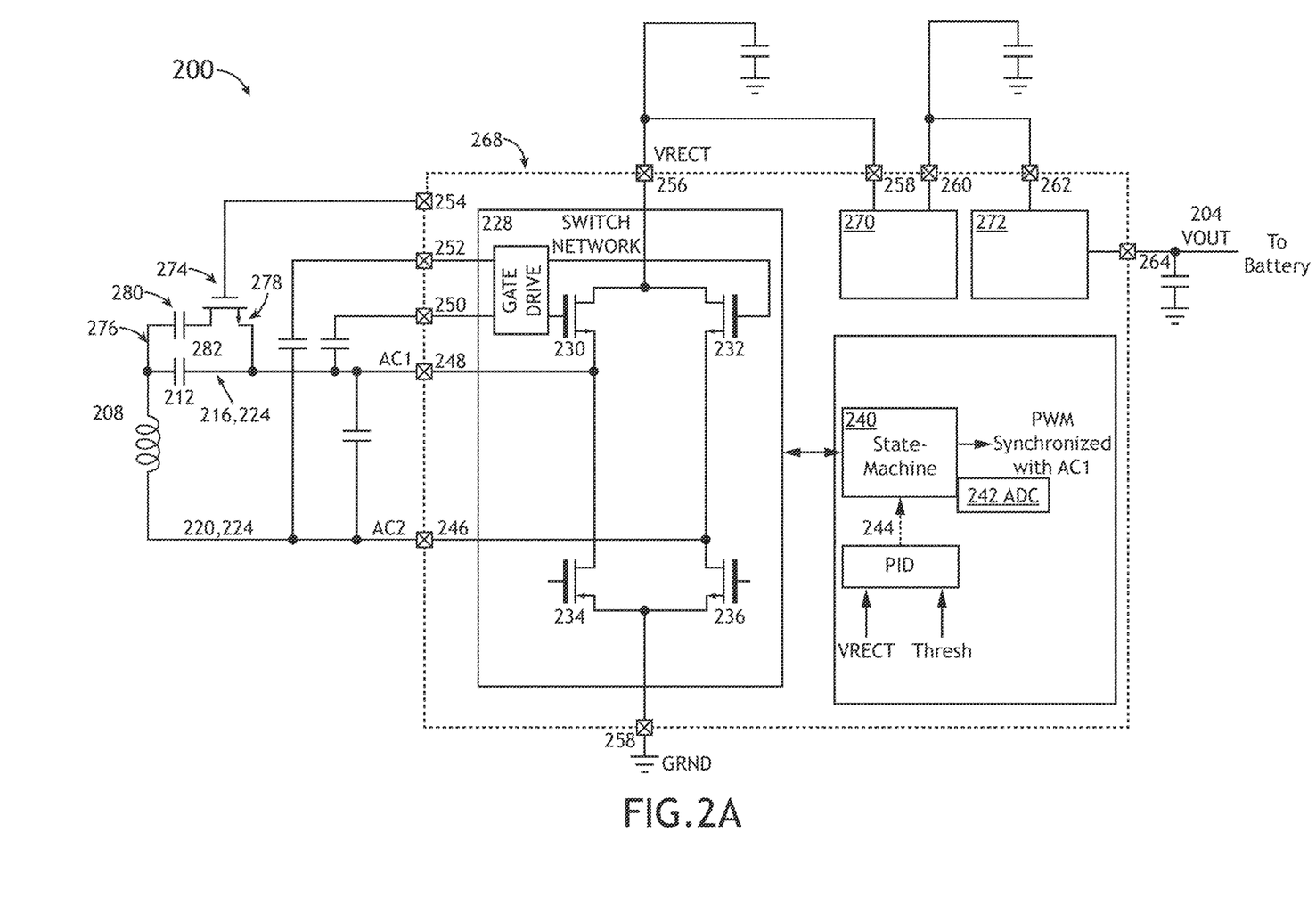
FIG. 2A is a circuit diagram illustrating a rectifier circuit, in accordance with one or more embodiments of the disclosure.

FIG. 2A is a circuit diagram illustrating a rectifier circuit 200 (e.g., a first circuit), in accordance with one or more embodiments of the disclosure. The rectifier circuit 200 may include some or all componentry of the wireless power receiver 128, the rectifying circuitry 132, and the rectifier control circuitry 136. The rectifier circuit 200 may harvest wireless power from any wireless power source. For example, the rectifier circuit 200 may harvest 6.78 MHz Alliance for Wireless Power (A4WP, also referred to as AirFuel) power transmissions. The rectifier circuit 200 facilitates efficiency improvements in receiving the transmitted energy and delivering it (e.g., as the rectified Direct Current (DC) voltage Vrect) to subsequent energy consuming stages in the device, such as to the battery 104 via $V_{out}$ 204.

Wireless power transmission suffers from efficiency losses at several stages, such as from converting a power source into a radio frequency (RF) wireless power signal transmission, receiving the RF flux of the wireless power signal 120, and converting the RF flux into a usable DC voltage in the receiving device. The wireless power receiver 128 may employ magnetic resonance achieved through matching the inductance and capacitance to the transmitter system to obtain a high Q receiver that is very responsive to a fundamental frequency (e.g., 6.78 MHz) of the wireless power signal 120. In that regard, the inductance may be provided by a receiving coil 208 that receives the flux of the wireless power signal. The inductance may also be, for example, one or more turns of a conductor on a printed circuit board, or another type of antenna. The inductance 202 produces an Alternating Current (AC) current and a first capacitor 212 may be tuned with respect to the receiving coil 208 to achieve the resonance that results in substantial responsiveness to the wireless power signal 120. The wireless power receiver 128 provides the AC current into the rectifier circuit 200 via the AC positive conductor 216 and the AC negative conductor 220 (e.g., collectively referred to as a first conductor 224).

The rectifier circuit 200 rectifies the AC current into a DC voltage, Vrect. Vrect may provide energy for any subsequent processing circuitry. In one implementation, the rectifier circuit 200 is wholly or partially integrated into an integrated circuit chip 268. The integrated circuit chip 268 may also be referred to as a "device". In other implementations, discrete components may be used. A switch network 228 receives power from the first conductor 224 and includes a plurality of switches (e.g., switches 230, 232, 234, and 236) arranged to rectify the wireless power input and generate a rectified voltage. The switches 230-236 may be Metal Oxide Semiconductor FETs (MOSFETs), for example, or other types of transistors or other types of switches.

The rectifier control circuitry 136 is in communication with the switch network 228. For example, the rectifier control circuitry 136 may control the ON and OFF states of the switches 230-236 to rectify the wireless power input using switching control outputs. The rectified wireless power input 162, Vrect, once generated, comprises a full-wave rectified version of the wireless power input. The rectifier control circuitry 136 may include a processing unit (e.g., state machine 240 containing one or more processors 144), an analog-digital converter (ADC 242) and a control loop mechanism, such as a proportional-integral-derivative (PID) controller 244 (e.g., analog or digital). Other control loop mechanisms may be utilized. The state machine may include any finite state processor including but not limited to a central processing unit (CPU) or an application specific integrated circuit (ASIC).

The rectifier circuit 200 further includes a plurality of pinouts 246, 248, 250, 252, 254, 256, 258, 260, 262, 264 that may be accessible to the rectifier control circuitry 136. For example, the rectifier control circuitry 136 may detect a state (e.g., current, voltage, oscillation) of power via one or more pinouts 246-264 and may be affect the state of the power (e.g., by injection) at one or more pinouts. For example, the rectifier control circuitry 136 may be in communication with the switch network 228, controlling switches 230, 232 to by delivering power at pinouts 250, 252, respectively (e.g., the power amplified via gate drivers 266). The pinouts 246-264 may be arranged on the integrated circuit chip 268, (represented by dotted square). The rectifier circuit may also include current sensing circuitry 270 and voltage regulating circuitry 272.

In embodiments, the rectifier circuit 200 further includes a bucking switch configured to control (e.g., buck) incoming voltage (e.g., incoming power from the coil 208). For example, the switch may be configured as, or include, a first field effect transistor (e.g., a first FET 274). The first FET 274 may be incorporated in one of several places within the rectifier circuit 200. The first FET 274 may handle high power inputs that may be deleterious to the integrated circuit chip 268 and may therefore be disposed outside of the integrated circuit chip 268 (e.g., as an external FET 274). For example, the first FET may be configured as an eternal FET that can effectively handle 115 volts or a maximum VDS of 117 volts. However, in some embodiments, the first FET 274 may be incorporated into the integrated circuit chip 268. The first FET may be configured as an insulated gate FET (MOSFET), a junction FET (JET) or a metal-semiconductor FET (MESFET). In operating as a buck converter, the first FET 274 operates to facilitate a step down a voltage from the input (e.g., a portion of the wireless power input) to an output that is controlled by an input signal to the gate of the first FET 274. Utilizing the first FET 274, the rectifier circuit 200 can regulate output voltage continuously, or only when the voltage rises above a threshold limit (e.g., semi-continuously).

In embodiments, the drain of the first FET 274 is coupled to the AC positive conductor 216 via a drain conductor 276 (e.g., the drain conductor 276 is configured as an electrically conductive element) and the source of the first FET 274 is coupled to the AC positive conductor 216 via a source conductor 278 (e.g., the source conductor 278 is configured as an electrically conductive element). A second capacitor 280 is disposed within the drain conductor 276. This arrangement forms a FET loop 282 (e.g., the arrangement forms a first loop) with parallel capacitors (e.g., the first capacitor 212 and the second capacitor 280). The gate of the first FET 274 is coupled to a pinout 254 that is accessible to the rectifier control circuitry 136. In this arrangement, the first FET 274/FET loop 282 acts as a dynamic capacitive switch to modulate the network reactance magnitude that is controllable by the control loop mechanism (e.g., PID controller 244) and state machine 240. For example, the PID controller 244 may receive a $V_{rect}$ value and a $V_{rect}$ threshold value, or predetermined $V_{rect}$ threshold value (e.g., a $V_{rect}$ threshold value set before instant operation of the rectifier circuit 200, such as during construction/programming of the rectifier control circuitry 136). If the $V_{rect}$ value is above the predetermined $V_{rect}$ threshold value, the PID controller 244 may transmit a pulse width modulation (PWM) instruction to the state machine 240, which then applies a PWM signal (e.g., a gate input) to the first FET 274 via pinout 254, The PWM signal may be synchronized with the power running through the AC positive conductor 216 (e.g., AC positive and/or AC negative waveforms) such that the first FET 274 is controlled by the PWM. For example, the state machine 240 may alter the period of the PWM signal or other PWM signal characteristic based on the power input received from the first conductor 224, effectively synchronizing the PWM signal to the wireless power input.

The ability of the first FET 274 to buck an input voltage is based on the ability of the first FET 274 to dynamically modulate an impedance that is generated by power flowing through the field coil 208 and the first capacitor 212 along the first conductor 224 to the switch network 228 (e.g., the first FET 274 receiving a portion of the AC input as a derived signal). For example, if the impedance of a signal along the first conductor 224 increases, the output signal, $V_{rect}$, drops for a given load, and the rectifier control circuitry 136 may then send a control signal to the gate of the first FET 274 to open or close the first FET 274 accordingly so that $V_{rect}$ is retained at a normal level.

Besides synchronizing the PWM signal to AC waveforms, other methods for controlling the first FET 274 are possible. For example, the first FET 274 may be controlled by hysteretic switching (e.g., with or without synchronization). For example, the rectifier circuit 200 may employ a hysteresis comparator to generate an input signal at the gate of the first FET 274, wherein the hysteresis comparator compares $V_{rect}$ to a threshold or reference voltage during operation. In another example, the rectifier circuit 200 may employ static control, where the first FET 274 is turned off when the input voltage is high, or near an overvoltage protection (OVP) threshold. The rectifier circuit 200 may then perform fine regulation using voltage collapse control or may dynamically adjust the load ballast to provide fine output voltage control. In another example, the signals to the gate of the first FET 274 may be controlled via a set/reset latch (e.g., an SR latch) or a hysteretic on/off control.

In some embodiments, the rectifier control circuitry 136 controls the operation of the first FET 274 via the use of current limitation values ($i_{LIM}$) (e.g., current thresholds, such as the rectifier turn-off threshold). Adjusting this threshold may control the rectifier input impedance. For example, when the threshold is negative current, the rectifier input capacitance increases. Controlling the input capacitance is one method to buck regulate as long as the coil network impedance is capacitive, which may be assured with switching via the first FET 274. In another example, the PID controller 244 may provide an $i_{LIM}$ input to the state machine 240, wherein the state machine compares the $i_{LIM}$ to an average measured current $i_{DC}$ (e.g., subtracts the $i_{DC}$ from the $i_{LIM}$) to determine a set current limitation value $i_{LIM}$ that is used to generate the gate input to the gate of the first FET 274 causing a negative phase shift, effectively regulating $V_{rect}$. The rectifier circuit 200 is able to use $i_{LIM}$ thresholds in bucking viva voltage because the rectifier circuit 200 is capacitive and the switch network 228 modulates the capacitance. For example, by using the state machine 240, the input capacitance can be modulated using negative phase shifting (e.g., by using negative $i_{LIM}$ thresholds). However, the rectifier circuit 200 may also buck $V_{rect}$ if the rectifier circuit 200 is inductive and the rectifier modulates the input inductance. For example, using a revised state machine 240, the input inductance can be modulated using positive phase shifting (e.g., by using positive $i_{LIM}$ thresholds). The state machine 240 may also be able to buck $V_{rect}$ if the rectifier circuit 200 includes true isolated switch functionality and the duty cycle throttles the current to $C_{rect}$, or if the rectifier circuit 200 is detuned to control the total reactance in adjusting $V_{rect}$ (e.g., the greater the reactance, the greater the voltage drop).

Figure 2B:
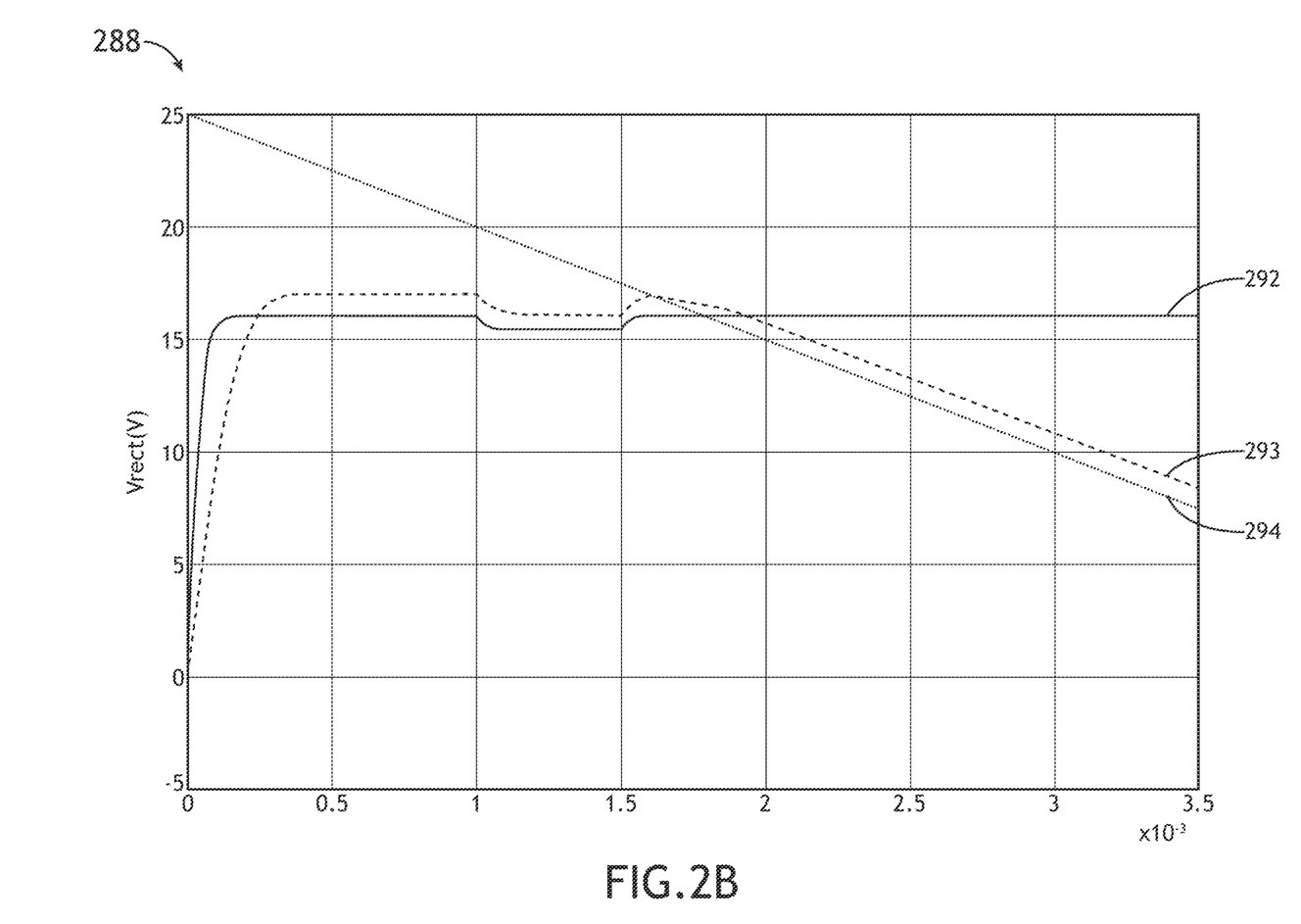
FIGS. 2B-C are graphs illustrating a $V_{rect}$/time plot as measured via a rectifying circuit, in accordance with one or more embodiments of the disclosure.
Figure 2C:
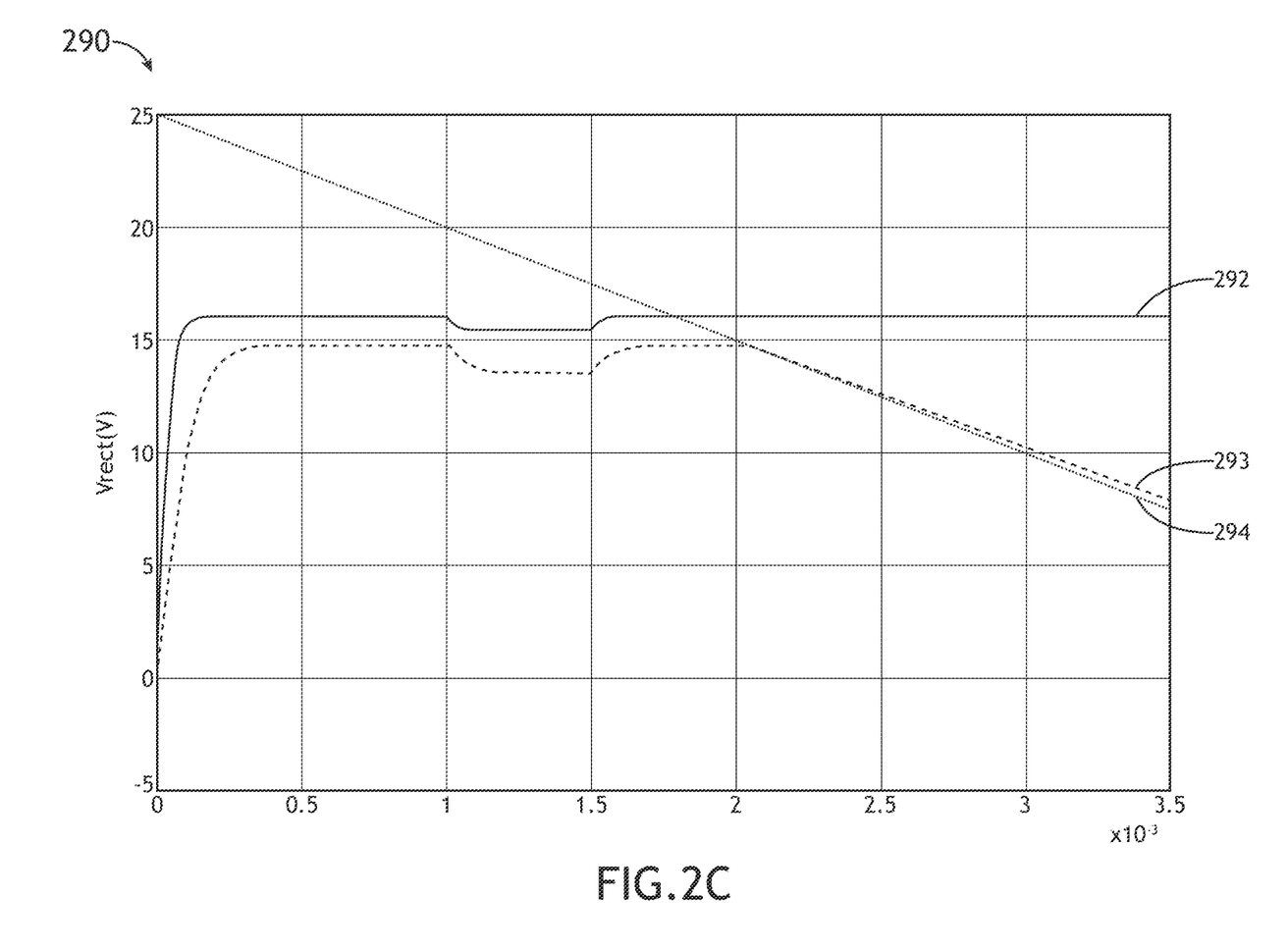

The ability of an external first FET 274 to rectify an input voltage is shown in graphs 288, 290 of FIGS. 2B-C, in accordance of one or more embodiments of the disclosure. Graph 288 illustrates a $V_{rect}$ (e.g., in volts) over time (ms) plot created from plot data derived from testing of the rectifier circuit 200 of FIG. 2A (e.g., where PWM was synchronized with AC waveforms) and demonstrates that the buck switches in variable series capacitance using a PID control with PWM signaling to the first FET 274. Graphed line 292 represents a normal system $V_{rect}$ without any buck circuitry or control. The bump at 1 ms is a result of the test system operating through an ASK modulation load pulse. Graphed line 293 represents the buck system $V_{rect}$ which is being controlled by the control voltage to the PID controller, represented by graphed line 294. As shown, in graph 188, the application of an overvoltage at time zero (e.g., 25 volts via the ramped control input) causes an immediate spike in the $V_{rect}$ of the tested circuit (e.g., graphed line 293). The rectifying circuit 200 prevents $V_{rect}$ from reaching an over voltage state, plateauing at approximately 17 volts. When the test input is ramped downward to approximately 7.5 volts, the $V_{rect}$ of the rectifying circuit 200 tracks to the ramped voltage.

A similar result is seen in graph 290 of FIG. 2B, which uses plot data derived from testing of the rectifier circuit 200 wherein the PID controller 244 modulates the input capacitance using negative phase shifting (e.g., by using negative $i_{LIM}$ thresholds). Here, the external FET is statically turned on to ensure the network is capacitive and then the $i_{LIM}$ thresholds are adjusted to lower the voltage (e.g., changes to the $i_{LIM}$ thresholds adjust the rectifier input capacitance). Therefore, the external first FET 274 is capable of bucking an input voltage using different control signal schemes.

Figure 2D:
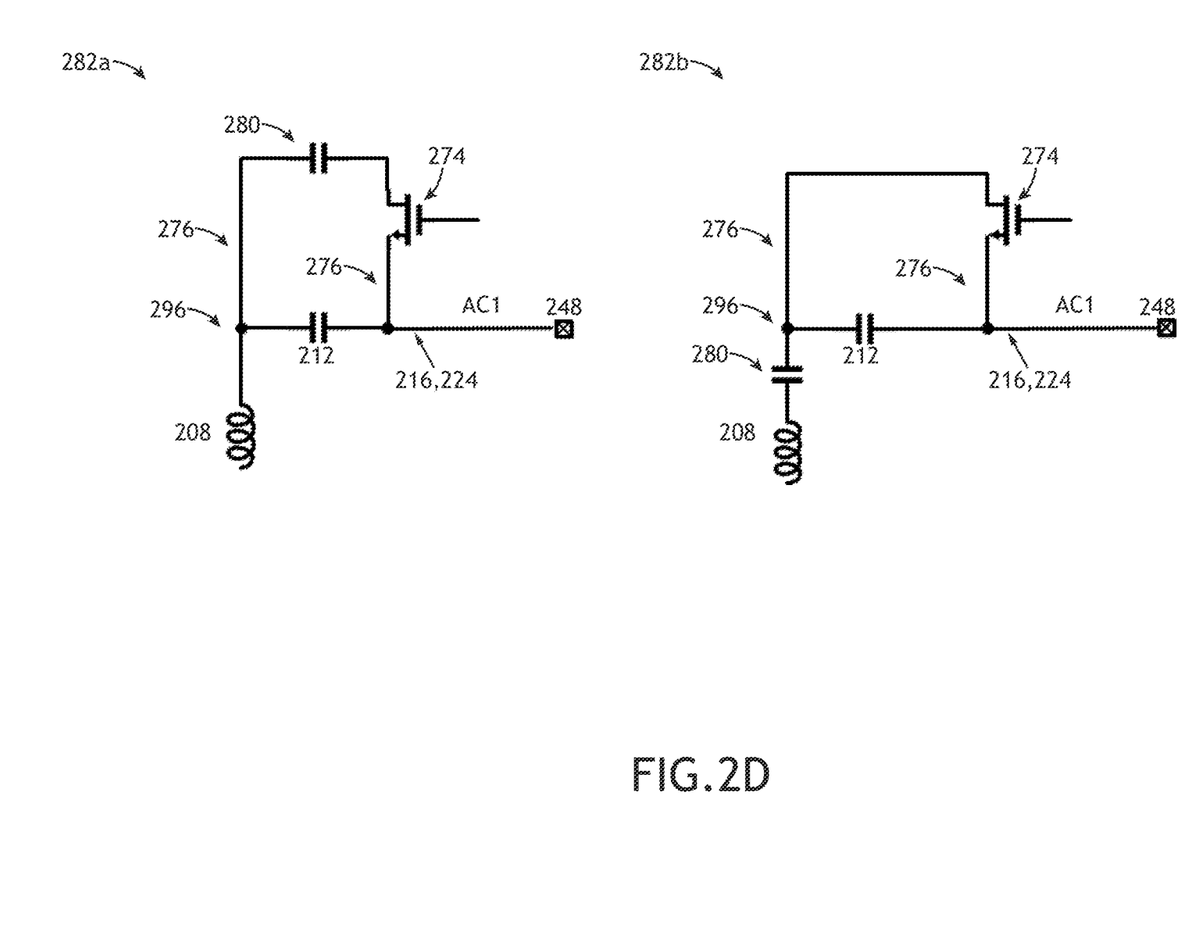
FIG. 2D is a circuit diagram illustrating partial rectifier circuits, in accordance with one or more embodiments of the disclosure.

Subcomponents or subcircuits of the rectifier circuit 200 may have more than one possible arrangement. For example, the rectifier circuit 200 may include one of two or more possible arrangements FET loop 282a-b as shown in FIG. 2D, in accordance with one or more embodiments of the disclosure. For instance, FET loop 282a, similar to the FET loop 282 as shown in FIG. 2A is shown with the second capacitor 280 positioned in-line between the external first FET 274 and a junction 296 that leads to the field coil 208 and the AC positive conductor 216. In another instance, the FET loop 282b shows the second capacitor 280 positioned in line between the junction 296 and the field coil 208. This second arrangement of the FET loop 282b for switching series capacitance demonstrates an improved, lower breakdown voltage than FET loop 282b.

Figure 3A:
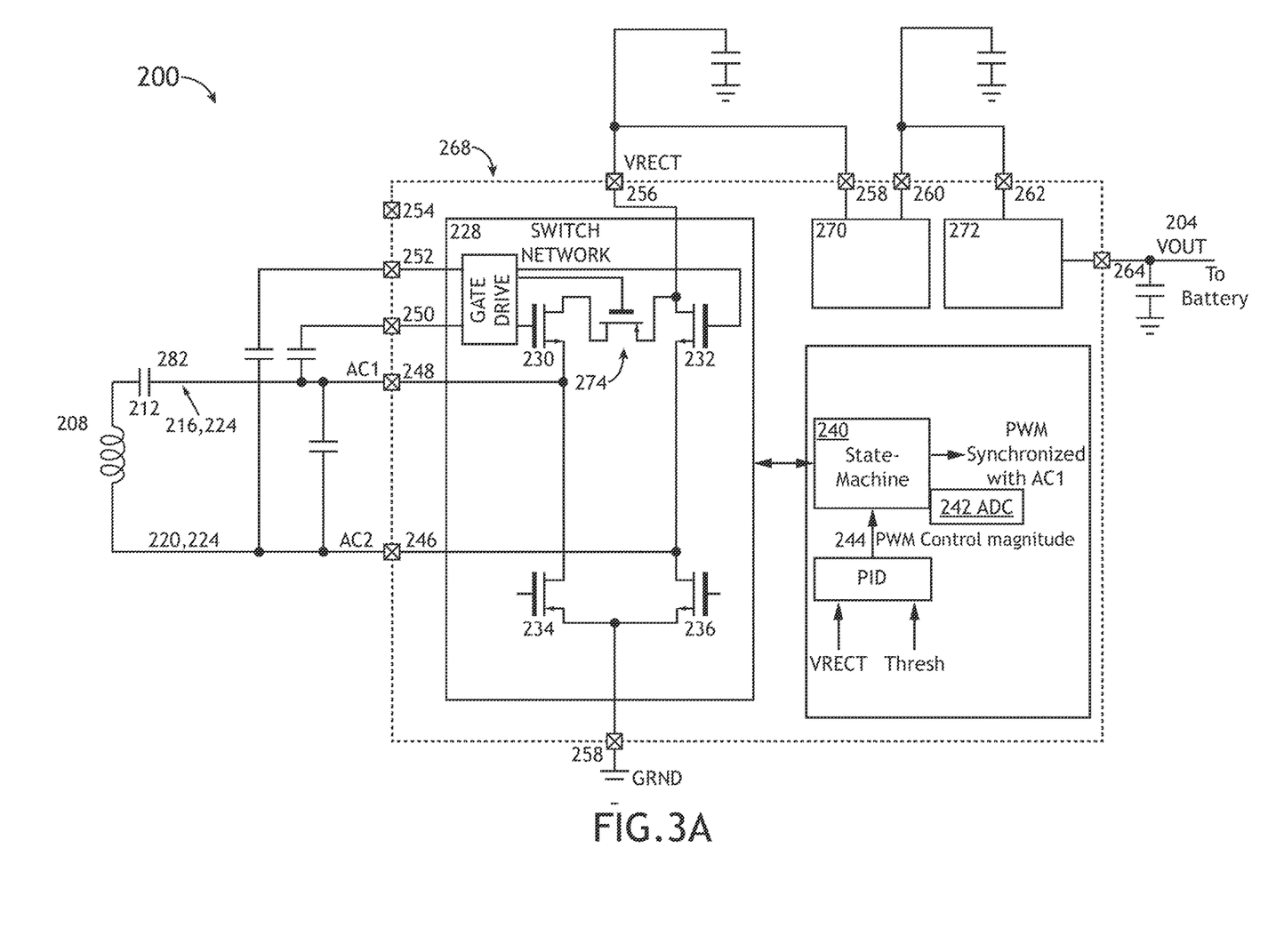
FIG. 3A-B. are circuit diagrams illustrating a rectifier circuit, in accordance with one or more embodiments of the disclosure.
Figure 3B:
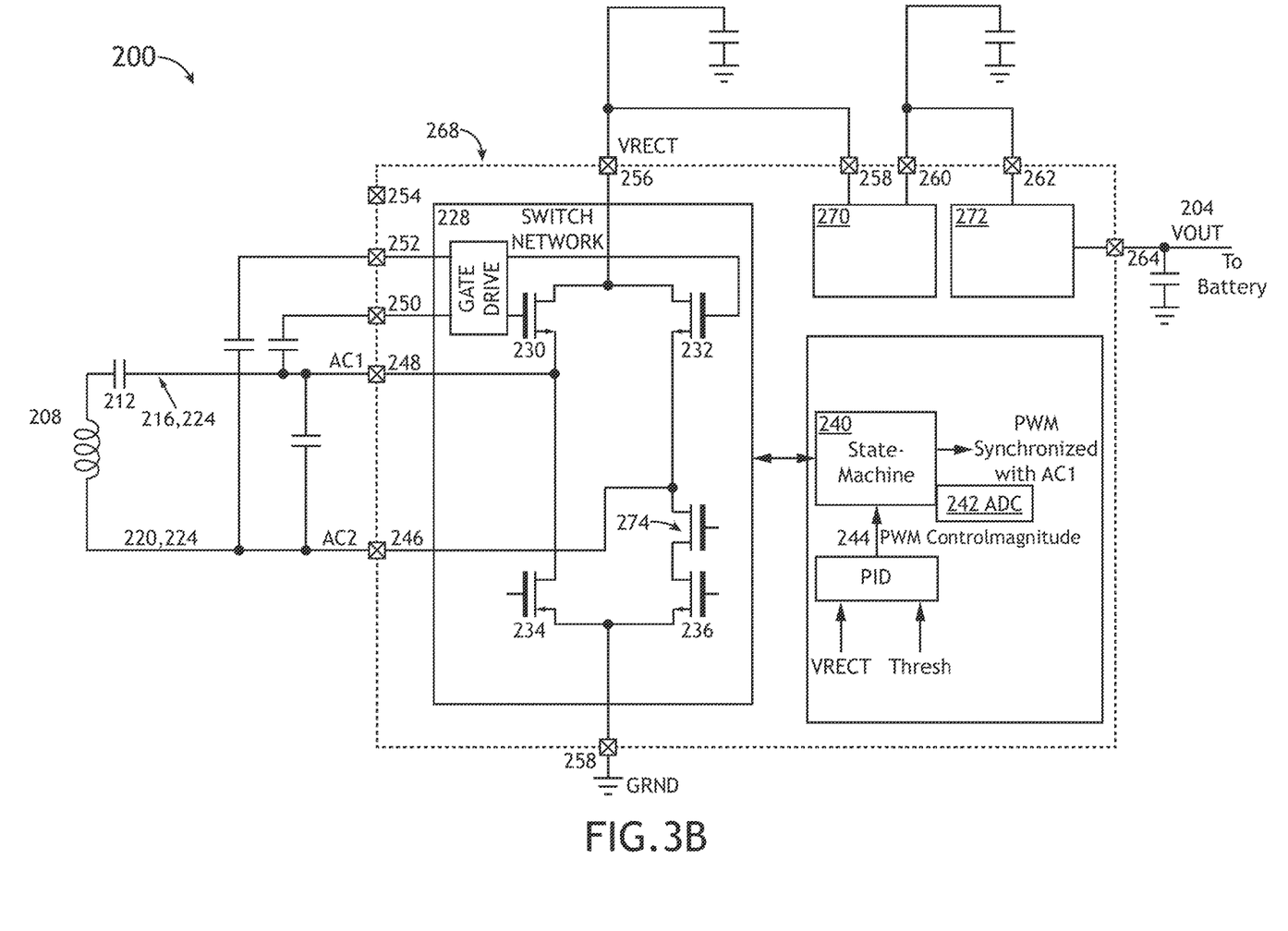

In some embodiments, the First FET 274 may be disposed internally within the switch network 228 (e.g., an internal FET). For example, the first FET 274 may be coupled at the gate to the gate driver 266 and operably coupled at the source and drain to switches 230, 232, as shown in FIG. 3A. In another example, the source and drain of the first FET 274 may be operably coupled to switches 232, 236, as shown in FIG. 3B. Other configurations are possible. The placement of the first FET 274 within the switch network stops current conduction for part of the duty cycle during operation. The PID controller 244 may then send signals to regulate the duty cycle, which then is synchronized to the AC waveforms via the state machine 240.

Figure 3C:
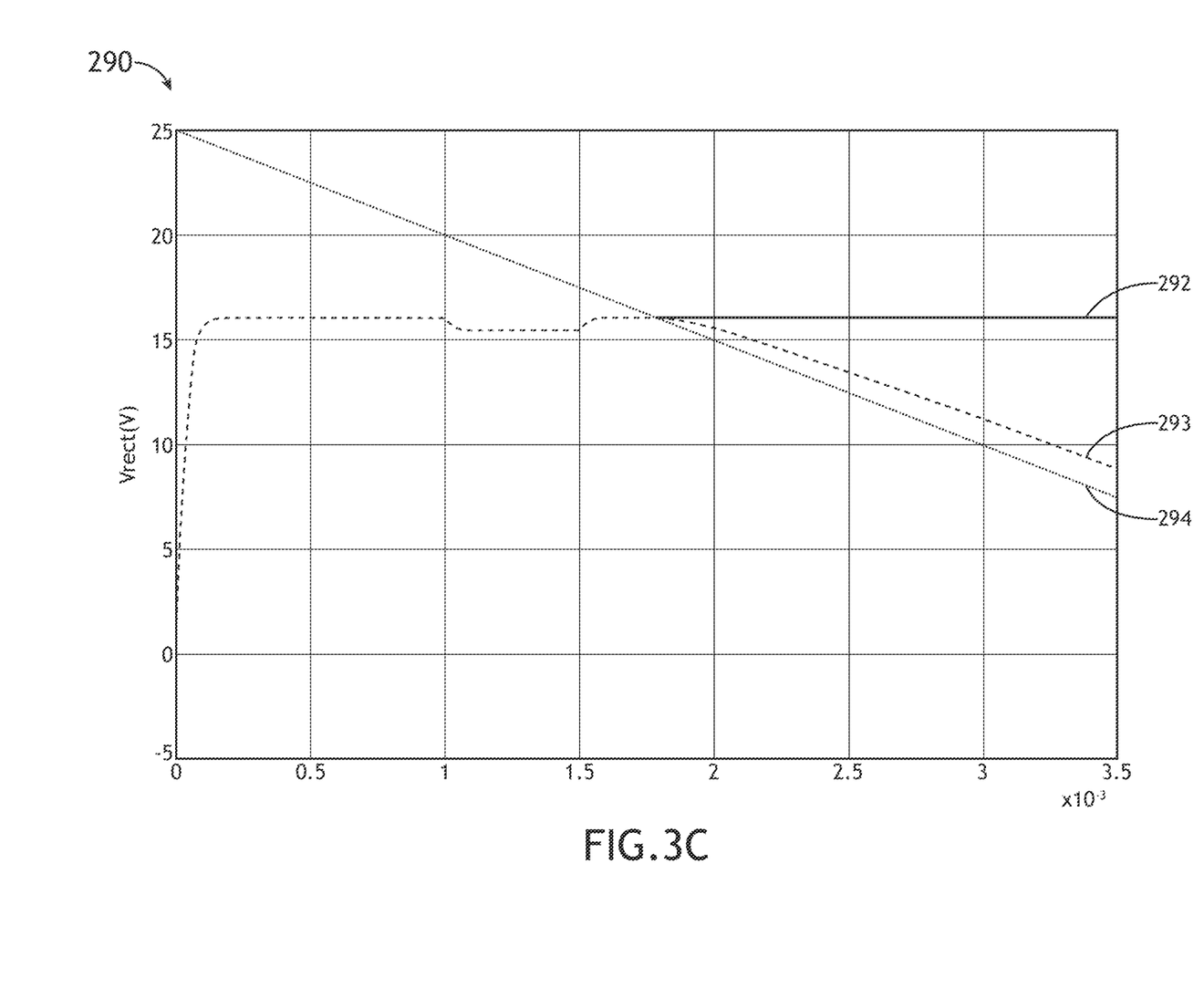
FIG. 3C. is a graph illustrating a $V_{rect}$/time plot as measured via a rectifying circuit, in accordance with one or more embodiments of the disclosure.

The rectifier circuit 200 of FIG. 3A was further tested for the ability of rectify a voltage, as shown in Graph 302 of FIG. 3C. Similar to the result of the testing of the rectifier circuit 200 in graphs 288, 290, graph 302 also shows the ability of the internal-FET 274 to rectify an over voltage, and maintain a steady-state $V_{rect}$ voltage of approximately 16 volts, with $V_{rect}$ decreasing as the ramped control input (e.g., line 294) falls below 15 volts.

Figure 4A:
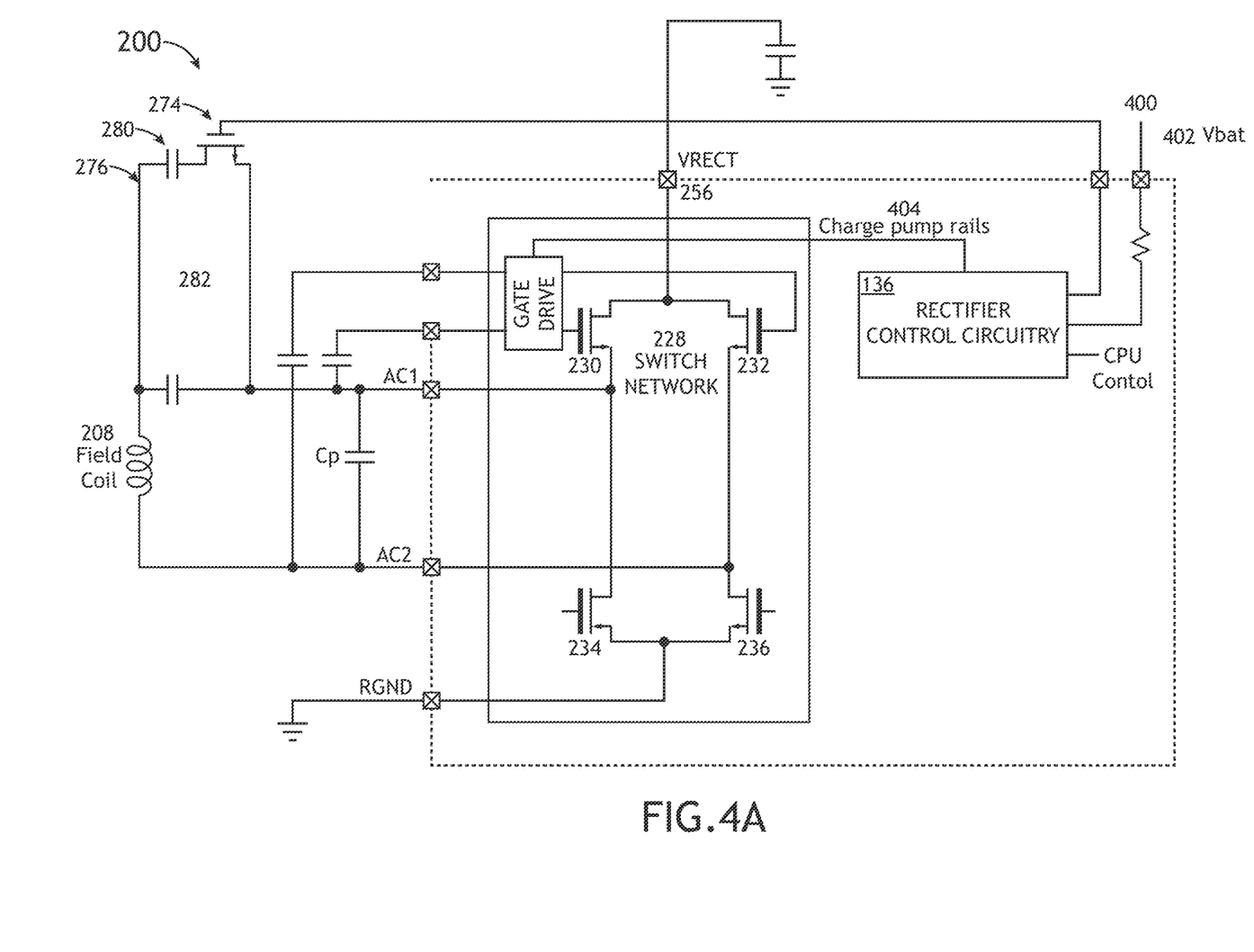
FIG. 4A is a circuit diagram of a rectifier circuit configured with a backup voltage system, in accordance with one or more embodiments of the disclosure.

During start-up, the rectifier circuit 200 requires a voltage to turn on the first FET 274. In some embodiments, the first capacitor 212 carries enough current to support start-up conditions in order for the rectifier circuit 200 to get enough voltage to then turn on the first FET 274. However, if the parallel capacitor is too large (e.g., has too high a capacitance), then a higher load on $V_{rect}$ is needed to maintain buck regulation. If the load is too weak, then there may be difficulty in turning on the first FET 274. However, there are several potential solutions for turning on the first FET 274. For example, the rectifier circuit 200 may utilize a backup voltage system to turn on the first FET 274, as shown in FIG. 4A. For instance, the battery 104 may be electrically couplable to a battery input 400 and supply a battery voltage ($v_{bat}$ 402) that provides a positive gate voltage when the rest of the integrated circuit chip 268 is powered down. For example, the battery 104 may supply a small load of approximately one µA. Upon powerup of the integrated circuit chip 268, the gate of the first FET 274 may then be controlled via a gate input transmitted by the rectifier control circuitry 136 or another processor 144 (e.g., CPU). Charge rails 404 used for the high side rectifier FETs (e.g., switches 230, 232) may also be used to drive the first FET 274 when system power is up.

Figure 4B:
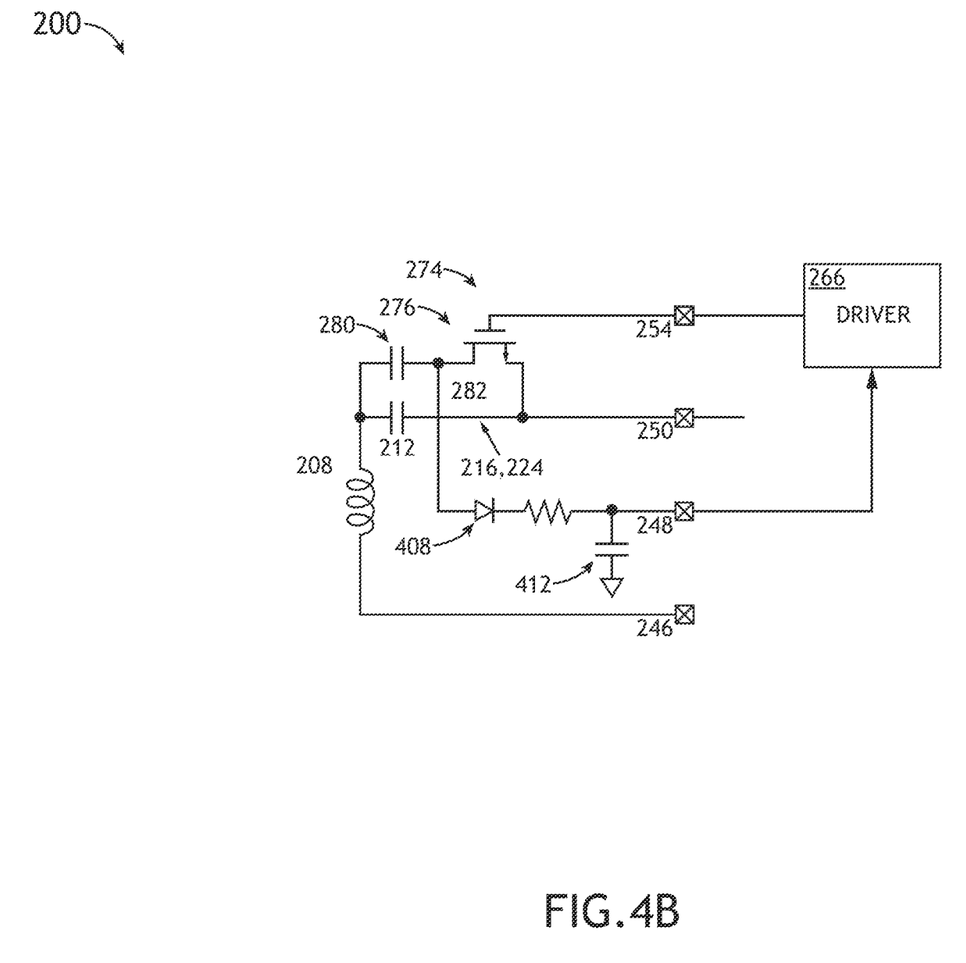
FIG. 4B is a partial circuit diagram of a rectifier circuit configured with a bootstrapping scheme, in accordance with one or more embodiments of the disclosure.

In another example, the first FET 274 is turned on at startup via a bootstrapping scheme as illustrated in FIG. 4B, which represents a portion of the rectifier circuit 200. For example, a diode 408 and a third capacitor 412 may be coupled to the drain conductor 276 leading to the first FET 274 and to the gate driver 266. This diode-capacitor subcircuit generates a bootstrap voltage and transmits a bootstrap voltage signal to the gate driver 266. The gate driver 266 then transmits a gate input to the first FET 274 based on the boot strap voltage that operates until the rectifier circuit 200 is up and running. The first FET 274 may be configured to operate in depletion mode FET, (wherein the FET is normally closed (ON) allowing current to pass, but is triggered to open (OFF) to impede current. In some embodiments, first FET 274 may be configured to operate in enhancement mode, wherein the transistor is normally open (OFF), but is triggered to close (ON).

The ability of the First FET 274 to buck voltage without causing intermittent shutdown of the charging scheme allows the user device 100 to converse back and forth with the wireless charger 108 (e.g., via ASK/FSK) without interruption. This constant communication allows the user device 100 to quickly convey to the wireless charger 108 if the power coming from the wireless charger 108 is at risk or causing an over voltage event (e.g., the first FET 274 can communicate during an over voltage condition). For example, the user device 100 may send a request (e.g., a modulated wireless signal, such as a signal generated by the coil 208) to the wireless charger 108 that the wireless charger modify/reduce the power that it is transmitting. The rectifier circuit 200 may operate under a tightly-coupled wireless power transfer scheme (e.g., having a receiving coil 208 matched to a specific/similar transmitting coil), but may also be able to operate under loosely-coupled arrangements (e.g., where the receiver coil 208 is matches with a typically larger transmitting coil).

Transistor switching, such as the switching on and off of the first FET 274 can lead to noise/EMI that can be disruptive to communication with the wireless charger 108. Noise can be controlled by adjusting the ratio of capacitors (e.g., 10-20 nano-farads to 700 nano-farads). Problems with noise may also be mitigated by switching at a high-enough frequency that is out of band for communication between the user device 100 and the wireless charger 108. Noise may also be mitigated through modulating the control frequency or PWM frequency via dithering.

The rectifier circuit 200 may be designed to work with any chipset, and may be used in a user device 100 that uses multiple coils 208, or a device that uses multiband charging schemes (e.g., a single coil with tuning for frequency). For example, the rectifier circuit 200 may utilize multiple first FETs 274 that can receive different wireless power input from multiple coils 208, or a tunable coil 208.

The rectifier circuit 200 may include two or more coils 208, with multiple first FETs 274 and/or sets or switch networks 228 that are matched to a specific coil 208, or to a specific set of coils 208. For example, the rectifier circuit 200 may include two or more coils 208 arranged in parallel or in series. Each coil 208 may have different operational characteristics where specific coils 208 are more suited for receiving power from specific wireless chargers 108 that transmit power with specific wireless power characteristics (e.g., frequencies). The rectifier circuit 200 may also have multiple sets (e.g., or a plurality) of switch networks 228 and/or first FETs 274, each operating with a specific coil 208 or a specific set of coils to in performing the rectification based on the wireless power characteristic of the wireless power unit, such as carrier frequency. For example, the rectifier circuit 200 may include two coils 208, a high frequency coil and a low frequency coil capable of receiving high frequency wireless power input signals (e.g., 205 kHz) and low frequency wireless input power input signals (e.g., 110 kHz), respectively. The rectifier circuit 200 may then include two first FETs 274 and/or two switch networks 228 that are designed to engage specifically the high frequency coil and the low frequency coil, creating two matched sets of coils 208 to FETs 274/switch networks 228. These matched sets of coils 208 and FETs 274/switch networks 228 ensure efficient reception and rectification of the incoming wireless power input signal.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A system comprising a first apparatus, the first apparatus comprising:
   a first receiver configured to receive a wireless power input;
   a first conductor coupled to the first receiver;
   a switch network coupled to the first conductor, wherein the switch network is configured to rectify the wireless power input and generate a rectified voltage;

a first field effect transistor coupled to the first conductor and configured to regulate the rectified voltage by modulating an impedance associated with the wireless power input; and
a gate driver coupled to the first field effect transistor and a diode coupled to the first field effect transistor and the gate driver, wherein the gate driver transmits a control signal based on a voltage signal transmitted from the diode to the gate driver.

2. The system of claim 1, further comprising a first controller configured to transmit a control signal to the first field effect transistor in response to the rectified voltage being above a voltage threshold.

3. The system of claim 1, wherein the first receiver is configured in parallel relative to the first conductor.

4. The system of claim 1, wherein the first receiver is configured in series relative to the first conductor.

5. The system of claim 1, further comprising a second field effect transistor coupled to the first conductor.

6. The system of claim 1, wherein the first field effect transistor comprises a gate configured to receive the control signal.

7. The system of claim 1, wherein the first apparatus comprises a wireless power transfer receiving circuit.

8. The system of claim 1, wherein the control signal comprises a pulse width modulation signal, the pulse width modulation signal is synchronized with the wireless power input at the first conductor.

9. The system of claim 1, further comprising a second apparatus, the second apparatus comprising a wireless power transfer transmitting circuit.

10. The system of claim 9, wherein a first controller is configured to send a communication to the second apparatus based on the wireless power input or the rectified voltage.

11. A system comprising:
a first receiver configured to receive a wireless power input;
a first conductor coupled to the first receiver;
a switch network coupled to the first conductor, wherein the switch network is configured to rectify the wireless power input and generate a rectified voltage;
a first field effect transistor coupled to the first conductor and configured to regulate the rectified voltage by modulating an impedance associated with the wireless power input; and
a first controller configured to transmit a control signal to the first field effect transistor;
wherein the first controller is configured to determine if the rectified voltage is above a voltage threshold.

12. The system of claim 11, wherein the control signal is based on a current threshold.

13. The system of claim 11, wherein the first controller comprises a state machine and a proportional-integral-derivative (PID) controller.

14. The system of claim 11, wherein the system is configured as a wireless power transfer system.

15. A system comprising:
a first receiver configured to receive a wireless power input;
a first conductor coupled to the first receiver;
a switch network coupled to the first conductor, wherein the switch network is configured to rectify the wireless power input and generate a rectified voltage; and
a first field effect transistor coupled to the first conductor and configured to regulate the rectified voltage in response to the rectified voltage being above a voltage threshold.

16. The system of claim 15, further comprising a first controller configured to transmit a control signal to the first field effect transistor, the first controller comprising a hysteretic ON/OFF control.

17. The system of claim 16, wherein the control signal comprises a pulse width modulation signal, the pulse width modulation signal is synchronized with the wireless power input at the first conductor.

18. The system of claim 15, wherein the first receiver is configured in parallel relative to the first conductor.

* * * * *